United States Patent [19]
Pavlicevic et al.

[11] Patent Number: 5,889,809
[45] Date of Patent: Mar. 30, 1999

[54] COOLING SYSTEM FOR ELECTRODES IN D.C. ELECTRIC ARC FURNACES

[75] Inventors: Milorad Pavlicevic, Udine, Italy;
Anatoly Kolesnichenko, Kiev, Ukraine;
Angelico Della Negra, Povoletto;
Alfredo Poloni, Fogliano Di Redipuglia, both of Italy

[73] Assignee: Danieli & C. Officine Meccaniche SpA, Buttrio, Italy

[21] Appl. No.: 936,624

[22] Filed: Sep. 24, 1997

[30] Foreign Application Priority Data

Sep. 27, 1996 [IT] Italy .................................. UD96A0182

[51] Int. Cl.⁶ ........................................................ H05B 7/12
[52] U.S. Cl. .............................. 373/72; 373/92; 373/108
[58] Field of Search ........................... 373/71–73, 93–95, 373/108; 266/34 L

[56] References Cited

U.S. PATENT DOCUMENTS

| | | | |
|---|---|---|---|
| 3,744,780 | 7/1973 | Pelczarski et al. | 266/34 L |
| 4,646,316 | 2/1987 | Michelet et al. | 373/72 |
| 5,125,003 | 6/1992 | Hamy et al. | 373/94 |

FOREIGN PATENT DOCUMENTS 0223991  6/1987  European Pat. Off. .
0682463  11/1995  European Pat. Off. .

OTHER PUBLICATIONS

Stahl Und Eisen, vol. 110, No. 8, Aug 14, 1990, Dusseldorf, DE pp. 91–98, XP000168123 Bullerschen K G et al: Kuehlung von Lichtbogenoffenelektroden Durch Waermerohre, p. 95 left–hald column, paragrah 2; figures 1,2.

*Primary Examiner*—Tu Ba Hoang
*Attorney, Agent, or Firm*—Antonelli, Terry, Stout & Kraus, LLP

[57] ABSTRACT

Cooling system for electrodes (11) in D.C. electric arc furnaces, the electrodes (11) comprising a part (11a) subjected to the hot environment of the furnace, this part being made of graphite in the case of a cathode and of copper in the case of an anode, the part (11a) being associated with a metallic part (11b) by means of a joint (13) which includes inside itself a hollow (14), comprising at least in correspondence with the metallic part (11b) a cooling circuit (20) with at least a delivery channel (15), a return channel (16) and a heat exchanger (18), the circuit (20) using liquid metal as a cooling fluid, there also being included means for the forced circulation of the cooling fluid consisting of a hydromagnetic pump (17).

25 Claims, 3 Drawing Sheets

COOLING SYSTEM FOR ELECTRODES IN D.C. ELECTRIC ARC FURNACES

BACKGROUND OF THE INVENTION

This invention concerns a cooling system for electrodes in D.C. electric arc furnaces.

The invention is applied to cool electrodes in D.C. electric arc furnaces used to melt metal alloys.

Although the cooling system can be applied both to the electrodes associated with the crown of the furnace (cathodes) and to the electrodes at the bottom of the furnace (anodes), in the following description, for reasons of practicality, we shall refer to the application of the system to an electrode functioning as a cathode.

At present, electrodes in electric arc furnaces, when they are functioning as a cathode, are generally composed of two main parts: a lower part made of graphite and an upper part made of metallic material, which also has a bearing function, associated with the electrode-bearing arm of the furnace.

When the electrode is functioning as an anode, the graphite part is replaced by a copper part, but the following description can be applied in the same way, with the appropriate transpositions and adaptations.

The two parts of the cathode are constrained together by an intermediate joint, normally threaded, made of an electricity-conducting material so as to allow the passage of electric current.

During the melting cycle the graphite part reaches very high temperatures and is progressively consumed so from time to time new segments of graphite are added. These temperatures cause a flow of heat from the graphite part to the metallic part of the electrode which can cause damage to its structure, apart from causing dispersion of the heat which is useful in the melting process being carried out.

Moreover, excessive over-heating of the intermediate joint can compromise the mechanical stability of the connection between the two parts of the electrode.

For this reason, the electrode needs a cooling system which acts in correspondence with the metallic part and which is able to remove a great part of the heat which migrates from the graphite part towards the metallic part.

This cooling system however must be achieved in such a way that the following three results are obtained concurrently:

- uniformity and control of the temperature of the metallic connection, so as not to subject it to mechanical stresses which make it unstable;
- a good electrical contact which reduces the Joule effect to a minimum;
- an increase in the heat resistance in order to diminish energy losses and to reduce the temperature of the mechanical connection.

These results are obtained all together if the cooling system in its entirety, either because of the material used or because of the structure or because of the dynamics of its functioning, makes it possible to obtain a low heat conductivity and at the same time a high electric conductivity.

SUMMARY OF THE INVENTION

It is well known however that this is difficult to achieve, as materials which have a high heat conductivity are also good electric conductors and vice versa.

EP-A-0.682.463 for example teaches to cool the anode by means of forced recirculating water, which is not electrically conductive.

This solution has given excellent results, but it is not considered to be definitely satisfactory.

Stahl und Eisen, vol. 110, n°. 8, 14 Aug. 1990 "Kuehlung von lichtbogenofenelelektroden durch waermerohre" provides to cool the electrodes by means of removing the heat produced by the evaporation and the subsequent condensation of the coolant, and by then putting it back into circulation by means of closed pipes.

In other words, it uses systems to transport the heat by vapours of the coolant which may be water or monatomic liquid metals (Hg, K, Na).

When using vapours, it uses the latent heat of the cooling fluid which evaporates and condenses.

EP-A-0.223.991 provides to cool oxygen injection nozzles in a convertor by means of molten liquid metal, made to circulate by means of a remote circulation pump, the liquid metal cooperating with a remote heat exchanger.

However, a circuit like this cannot be adopted in association with electrodes for electric furnaces, given the problems of installation and maintenance which it would cause, and also the problems connected with the carrier currents and eddy currents which would come into play in such a circuit.

The present applicants have therefore designed, tested and embodied this invention to overcome the shortcomings of the state of the art, and to achieve further advantages.

This invention is set forth and characterised in the main claim, while the dependent claims describe variants of the idea of the main embodiment.

The purpose of the invention is to provide a cooling system for electrodes in D.C. electric arc furnaces which will ensure an efficient cooling action on the metallic part of the electrode, and will also be able to control and limit to desired values the flow of heat which, from the part subjected to high temperatures, whether it be the graphite part of the cathode or the copper part of the anode, is transmitted to this metallic part, maintaining substantially unchanged the characteristics of electroconductivity of the electrode itself.

A further purpose of the invention is to ensure a low temperature of the connection between the graphite or copper part and the metallic part in order to obtain a high mechanical stability of the connecting joint.

Another purpose of the invention is to obtain this cooling without compromising the electric conductivity of the electrode.

A further purpose is to achieve a lower consumption of energy in the feeding of the furnace.

The cooling system according to the invention can be used, with the appropriate adaptations, both with electrodes functioning as a cathodes and with electrodes functioning as an anode.

The invention includes a closed circuit cooling system which uses melted metal, not in its vaporous state, to transport the heat, and thus uses the perceptible heat transported by the cooling fluid.

The metal used as a cooling fluid is, according to the preferred embodiment, a eutectic of lead and bismuth, (for example lead 55% and bismuth 45%).

According to a variant, either tin, sodium, potassium or lithium can be used as a cooling fluid; in this case too, the metal is maintained in its molten state and not as vaporised metal.

The closed circuit comprises upwards and downwards channels for the cooling fluid and at least one element which functions as a heat exchanger.

According to the invention, at least some of these channels cooperate with a hydromagnetic pump activated by the passing of a current.

According to a further embodiment, inside the connecting joint between the graphite part and the metallic part of the electrode there is a hollow of the appropriate form in which the cooling fluid circulates.

The metal functioning as the cooling fluid, in one embodiment of the invention, at ambient temperature is in its solid state and is melted by the effect of the heat generated by the electric arc, the passage of the electric current (Joule effect) and the heat exchange with the inner part of the furnace in the various steps of the melting process.

According to a variant, the metal is already in its liquid state at ambient temperature.

According to a further variant, the metal at ambient temperature is in its solid state and is composed of tiny bearings or other granular bodies of tiny dimensions.

According to a variant, a first channel, or delivery channel, cooperates with the hydromagnetic pump which delivers the liquid metal to the channel which develops in correspondence with the side walls of the metallic part of the electrode.

According to another embodiment, the outer side walls of the delivery channel are made of two metallic jackets closely associated together, one of which (the inner or outer) is made of copper or its alloys, and the other of which (the outer or inner) is made of metal or its alloys.

According to another variant, a second channel, or return channel, from which the hydromagnetic pump sucks in the liquid metal, is developed in an area near the axis of the electrode.

According to one embodiment of the invention, the delivery and return channels for the circulation of the liquid metal directly communicate with the inner hollow of the joint.

According to a variant of this embodiment, between the two environments, that is between the delivery and return channels and the inner hollow, there is a grid with conveyor/deflector elements suitable to direct the liquid metal from the delivery channel towards the hollow and from the hollow towards the return channel.

In correspondence with the heat exchanger, the liquid metal gives up heat to the outer environment, cools down and returns to the desired temperature.

According to this embodiment, the flow of liquid metal arriving from the delivery channel, apart from cooling the walls of the metallic part of the electrode and the walls of the joint, also removes the heat arriving from the graphite part of the same electrode.

According to a further embodiment of the invention, between the circulation channels of the liquid metal and the hollow inside the joint, there is a separator element suitable to create two distinct cooling circuits. In one possible solution, the metal in the two circuits is the same.

According to a variant, in the two cooling circuits there are two different cooling fluids.

In this case, according to the preferred embodiment of the invention, in the main circuit a eutectic of lead and bismuth is made to circulate, whereas in the hollow lead or sodium circulates.

According to a variant, on the separator element there are mounted laminar diaphragms made of a highly electroconductive material (for example copper) arranged substantially parallel to the axis of the electrode.

According to a further variant, the hollow in the joint has, in cooperation with the graphite part and substantially in correspondence with the axis of the electrode, a conveyor insert of an elongate form developing upwards.

This conveyor insert, made of a metal with greater electroconductive properties than that of the joint, is the main passageway for the electric current from the graphite part to the metallic part of the electrode.

The passage of the electric current through the conveyor, and from the conveyor to the metallic part of the electrode, according to the variation in the density of the current, causes the formation of vortexes inside the hollow which lead the liquid metal to rise in correspondence with the walls of the conductor insert and then to descend along the inner walls of the hollow.

This circulation inside the hollow is in an opposite direction to that of the metal in the main circuit, which makes it possible to obtain a considerable level of uniformity of the temperatures in the mechanical connection.

The side walls of the conveyor insert are electrically shielded in order to concentrate the flow of the current to the two ends.

In the embodiment which includes the separator element, the liquid metal inside the hollow is used to make the temperature of the joint uniform, while the liquid metal circulating in the channels has a cooling function and also serves to remove the flow of heat arriving from the graphite part of the electrode.

According to the invention, in the area where the graphite part and the metallic part join, the joint includes an air ring suitable to convey the flow of electric current and therefore the heat to a position corresponding with the central area of the electrode.

According to a variant, on the lower face of the joint in contact with the graphite part, there is a metallic element which melts at a low temperature (for example, lead).

This element, which is passed through by the electric current, melts and thus increases in volume; it rises up the joint and positions itself between the two parts of the joint itself, thus improving the mechanical connection and the passage of the current.

The system according to the invention therefore makes it possible to cool the walls of the metallic part of the electrode and contrast the rise of the flow of heat arriving from the graphite part, keeping unchanged the electroconductive characteristics of the electrode and therefore without causing functional imbalances of the furnace.

The system according to the invention also makes it possible to make the temperature of the joint uniform and maintain it within the appropriate values, this in order to guarantee the mechanical stability of the connection between the graphite part and the metallic part; this stability moreover is increased as a result of the interstices between the walls of the joint being filled.

According to the invention, the intensity of the cooling of the side walls of the metallic part of the electrode and the level of the temperature of the joint can be varied by intervening on the functioning cycle of the hydromagnetic pump and/or on the position and/or the characteristics of the heat exchanger.

In one embodiment of the invention, the whole cooling system can be replaced to carry out operations to restore, maintain or substitute the used metal.

BRIEF DESCRIPTION OF THE DRAWINGS

The attached figures are given as a non-restrictive example and show some preferred embodiments of the invention as follows:

FIG. 3 shows the longitudinal section of an electrode in an electric arc furnace using the cooling system in a second embodiment of the invention;

DETAILED DESCRIPTION OF THE PREFERRED EMBODIMENTS

Figure 1:
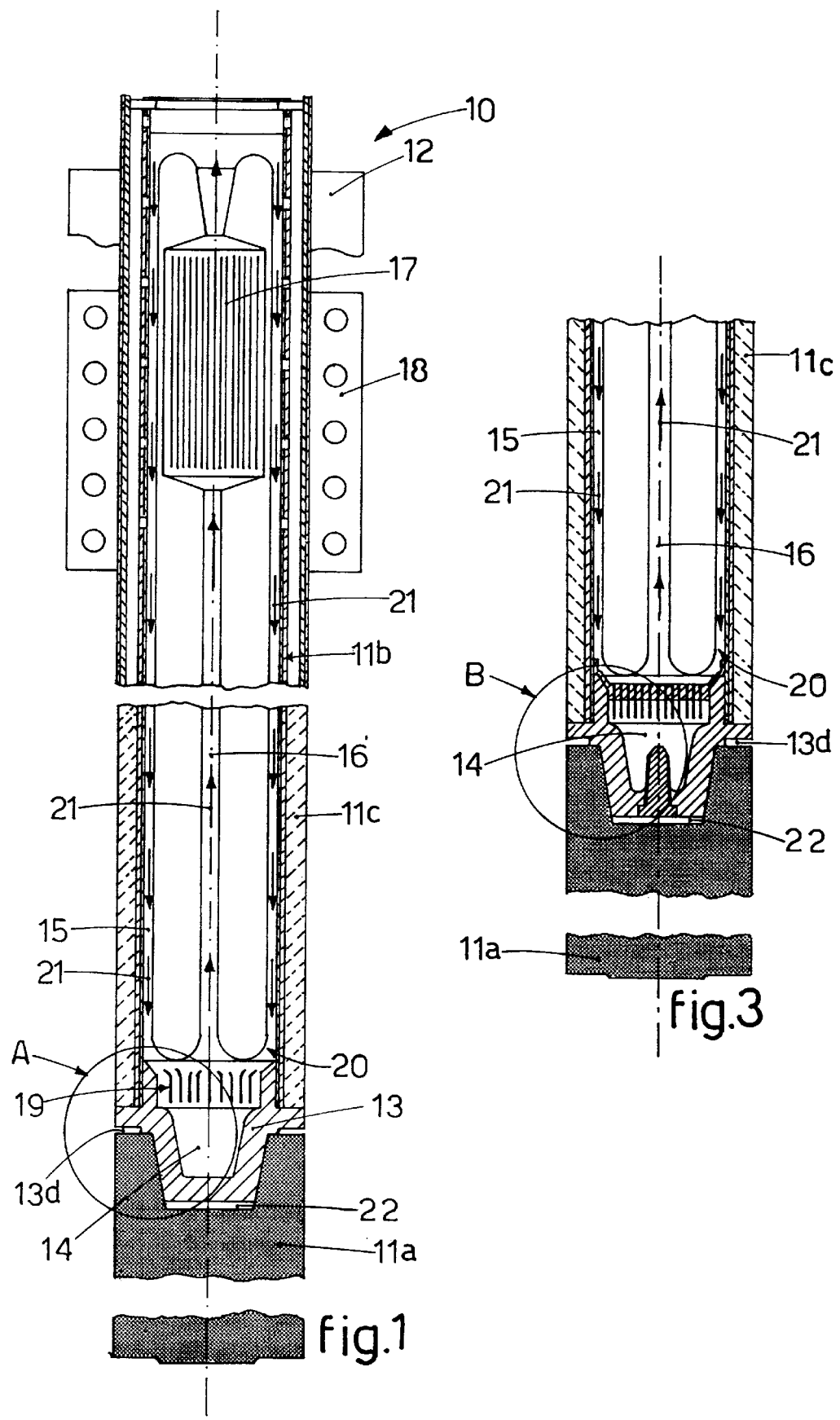
FIG. 1 shows the longitudinal section of an electrode in an electric arc furnace using the cooling system in a first embodiment of the invention.

In the attached figures, the number 10 indicates the cooling system for electrodes 11 in D.C. electric arc furnaces.

In the case shown, the electrode 11 functions as a cathode, it has a graphite part 11a above and a metallic part 11b below which also functions as a bearing element associated with its own means 12 to grip the electrode-bearing arm.

In this case, the structure of the metallic part 11b is composed of two metallic jackets closely associated together one of which either 111b or 211b is made of copper or its alloys and the other of which 211b or 111b is made of iron or its alloys.

This configuration of the metallic part 11b is advantageous in that it gives high characteristics of both mechanical resistence and also of electric conductivity; the metallic part 11b is, moreover, in its lower part, covered on the outside by a refractory layer 11c.

According to the invention, the graphite part 11a and the metallic part 11b are associated together by means of a threaded joint 13, which has inside a hollow 14 filled with metal with a desired melting temperature.

This hollow 14 cooperates with a circuit 20 containing the same metal and comprising a delivery channel 15 which develops along the inner side wall 111b of the metallic part 11b, a return channel 16 which develops in a central position with respect to the metallic part 11b, a hydromagnetic pump 17 communicating with the two channels 15, 16 and a heat exchanger 18 mounted outside on the metallic part 11b and associated with the delivery channel 15.

In this case, the delivery channel 15 develops in an annular way, while the return channel 16 extends coaxially with respect to the metallic part 11b of the electrode.

According to the invention, the heat developed inside the furnace causes the metal contained inside the hollow 14 and the circuit 20 to melt, in the event that this metal is in its solid state at ambient temperature.

Once the metal is completely melted, it enters into circulation under the effect of the hydromagnetic pump 17.

According to another embodiment, the metal is already in its liquid state at ambient temperature.

According to another embodiment, the metal is in its solid state and is composed of little bearings or other granular bodies with a small dimension, which facilitates and accelerates the first melting step.

The hydromagnetic pump 17 sucks in the melted metal from the return channel 16 and sends it, through the delivery channel 15, towards the heat exchanger 18 where this liquid metal gives up heat to the outer environment before reaching the hollow 14 (FIG. 1). At this stage, the flow 21 of liquid metal along the delivery channel 15 causes the side walls 111b, 211b of the metallic part 11b to cool down.

Figure 2:
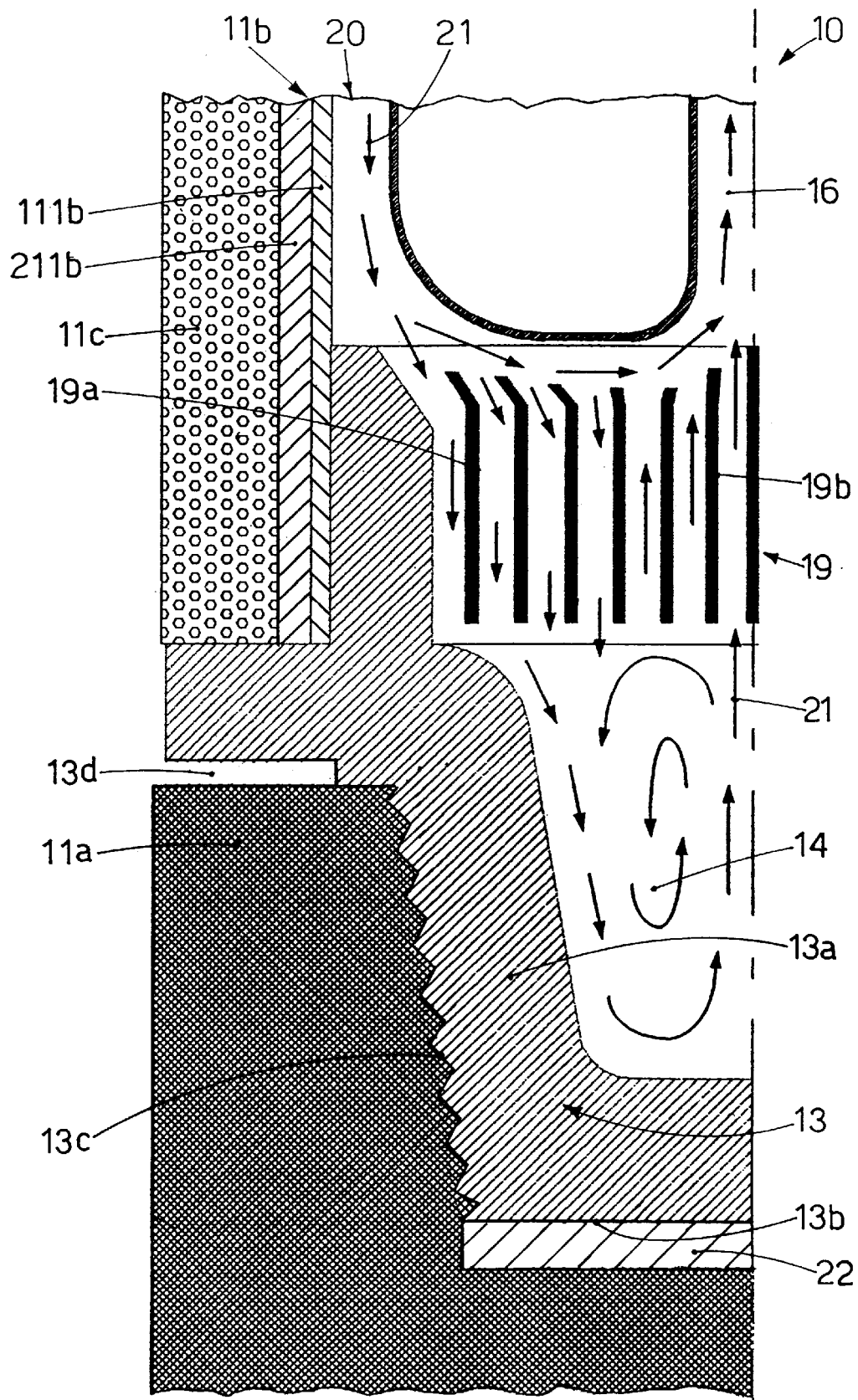
FIG. 2 shows the detail "A" of FIG. 1.

In an intermediate position between the hollow 14 and the two channels 15, 16 there is a laminar grid 19 which has on its periphery deflectors 19a positioned in such a way as to direct, at least partly, the flow 21 of the liquid metal arriving from the delivery channel 15 into the hollow 14 (FIG. 2).

The laminar grid 19 has, in a central position, deflectors 19b positioned in such a way as to direct the flow 21 of liquid metal from the hollow 14 to the return channel 16.

This direction of circulation of the flow 21 of liquid metal is opposite to the direction taken by the electric current and of the consequent flow of heat which from the graphite part 11a spreads towards the metallic part 11b mainly through the walls 13a of the joint 13.

This difference in direction between the flow 21 of liquid metal and the flow of heat causes a reduction in the dispersion of heat which is useful for the melting process taking place; it is also useful to cool the joint 13, which allows the temperature of the joint to be maintained within appropriate values, to the advantage of the mechanical stability of the connection between the two parts 11a, 11b.

This mechanical stability is increased further by including a plate 22 made of a metal which melts at a low temperature, for example lead, between the lower face 13b of the joint 13 and the graphite part 11a. When the electric current passes through, this plate 22 melts, increases in volume and expands into the interstices 13c between the threads of the joint 13 and of the graphite part 11a.

According to the invention, in order to limit the passage of the electric current and therefore the flow of heat in the peripheral areas of the electrode 11, the joint 13 has, in its outermost part, an air ring 13d to separate it from the graphite part 11a. Due to the presence of this air ring 13d, the electric current and the relative flow of heat spread mainly through the side walls 13a of the joint 13, therefore in the area of greatest efficiency of the cooling system 10.

Figure 4:
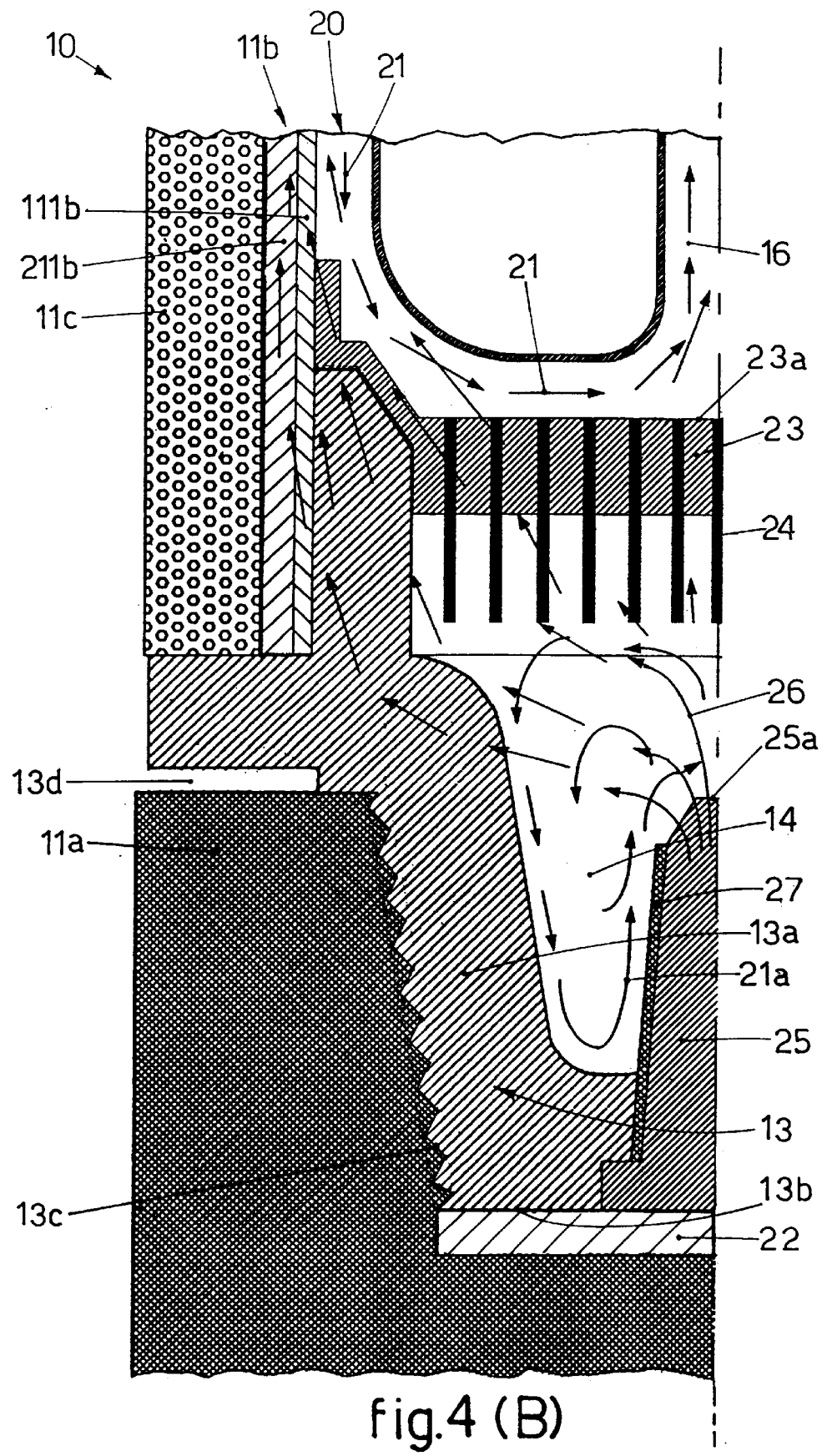
FIG. 4 shows the detail "B" of FIG. 3.

According to the variant shown in FIGS. 3 and 4, the hollow 14 does not communicate with the delivery channel 15 and return channel 16, it is separated from them by means of a separating wall 23, in this case solid with the joint 13. On this separating wall 23 there is a plurality of laminar diaphragms 24, made of a highly electroconductive material (such as copper), arranged substantially parallel to the longitudinal axis of the electrode 11 and, in this case, extending from the upper face 23a of the separation wall 23 up to the hollow 14.

In a coaxial position with respect to the joint 13 there is solidly associated a conveyor insert 25 made of a highly electroconductive material (for example, copper).

This conveyor insert 25 is of an elongate form and extends upwards inside the hollow 14; in correspondence with the outer side walls, it is lined with a layer of electrically insulated material 27.

This configuration of the conveyor insert 25 causes the flow 26 of current to take a preferential path; from the graphite part 11a it spreads mainly through the conveyor insert 25 from one end to the other until, near the top 25a of the conveyor insert 25, it expands into the hollow 14.

This causes the formation of vortical flows 21a of liquid metal inside the hollow 14 which then move upwards in correspondence with the conveyor insert 25 and descend again near the side walls 13a of the joint 13. The vortical flow 21a of liquid metal makes it possible to cool the joint 13 and, also because it flows in the opposite direction to the flow in the main circuit 20, to make the temperature uniform by giving up its heat to the flow of liquid metal 21 circulating in the main circuit 20 through the laminar diaphragms 24.

By using liquid metal as a cooling fluid the system according to the invention is able to maintain substantially unchanged the characteristics of electroconductivity of the electrode 11 without causing imbalances with regards to the functionality of the electric furnace.

The invention makes it possible to exploit intensively the effect of electromagnetic agitation of the cooling fluid as generated by the lines of electric current, the effect of which is exasperated by the geometric disposition of the parts.

We claim:

1. An electrode for a DC electric arc furnace, comprising:

a metallic part;

a part subject to the hot environment of the furnace, the part subject to the hot environment being made of graphite or copper;

a joint having a hollow inside joining the metallic part and the part subject to the hot environment;

a cooling circuit comprising a delivery channel, a return channel and a heat exchanger, at least the delivery channel and the return channel being provided within at least the metallic part, the cooling circuit containing a metal as a cooling fluid, the metal circulating in the cooling circuit in a liquid state at least during operation of the furnace; and a hydromagnetic pump for forcing circulation of the metal cooling fluid in the liquid state through the cooling circuit.

2. An electrode as in claim 1, in which the heat exchanger is provided outside the metallic part.

3. An electrode as in claim 1, in which the delivery channel and the return channel extend to within the hollow inside the joint.

4. An electrode as in claim 1, in which there is provided at least one conveyor insert which extends lengthwise from a bottom of the hollow towards an upper part of the hollow.

5. An electrode as in claim 4, in which the conveyor insert has on its lateral periphery a layer of electrically insulating material.

6. An electrode as in claim 1, further comprising an element made of low melting metal provided between the joint and the part subject to the how environment which serves to disperse heat and occlude interstices between the joint and the part subject to the hot environment.

7. An electrode as in claim 1, in which in a separation area between the part subject to the hot environment and the metallic part there is provided an air ring.

8. An electrode as in claim 1, further comprising a laminar grid with annular deflectors provided in the hollow of the joint.

9. An electrode as in claim 8, in which the deflectors include elements to direct and convey the cooling fluid.

10. An electrode as in claim 1, further comprising a separating wall between the hollow and the delivery and return channel.

11. An electrode as in claim 10, in which the separating wall includes circular laminar diaphragms which extend inside the hollow.

12. An electrode as in claim 1, in which an outer wall of the delivery channel includes a layer made of copper or its alloys and a layer made of iron or its alloys.

13. An electrode as in claim 1, in which the metal used is an eutectic of lead and bismuth.

14. An electrode as in claim 1, in which the metal used is tin.

15. An electrode as in claim 1, in which the metal used is sodium.

16. An electrode as in claim 1, in which the metal used is potassium.

17. An electrode as in claim 1, in which the metal used is lithium.

18. An electrode as in claim 1, in which the metal, at ambient temperature, is in its solid state.

19. An electrode as in claim 1, in which the metal, at ambient temperature, is in its liquid state.

20. An electrode as in claim 1, in which the metal, at ambient temperature, is in a solid granular state.

21. An electrode as in claim 1, in which the delivery channel is toric in form and extends around a circumference of the metallic part of the electrode.

22. An electrode as in claim 1, in which the return channel extends centrally and axially to the electrode.

23. An electrode as in claim 1, wherein the electrode is a anode and part subject to the hot environment is made of copper.

24. An electrode as in claim 1, wherein the electrode is a cathode and part subject to the hot environment is made of graphite.

25. A method for cooling an electrode for a DC electric arc furnace, the electrode comprising a metallic part, a part subject to the hot environment of the furnace, the part subject to the hot environment being made of graphite or copper, and a joint having a hollow inside joining the metallic part and the part subject to the hot environment, the method comprising circulating a metal cooling fluid in a liquid state through a cooling circuit comprising a delivery channel, a return channel and a heat exchanger, at least the delivery channel and the return channel being provided within at least the metallic part.

* * * * *